H. H. HARRIS.
TRUCK.
APPLICATION FILED APR. 16, 1913.
1,081,041.    Patented Dec. 9, 1913.
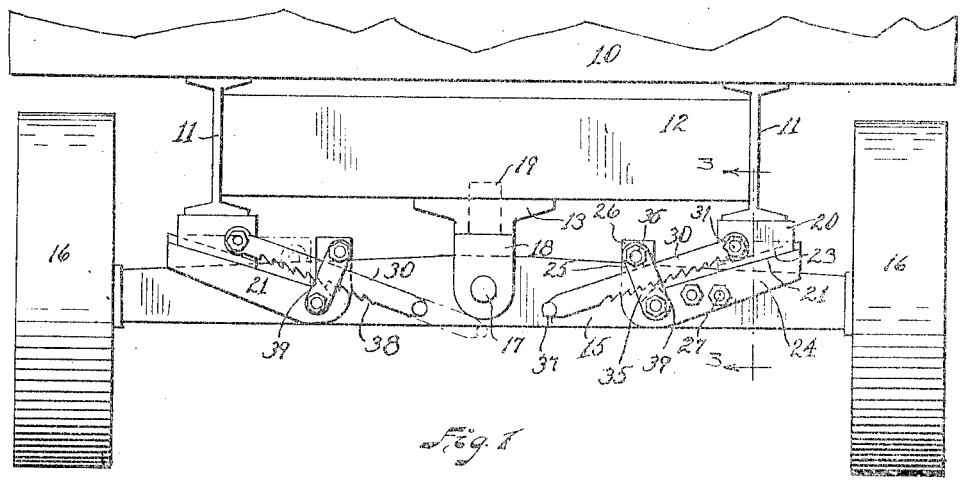
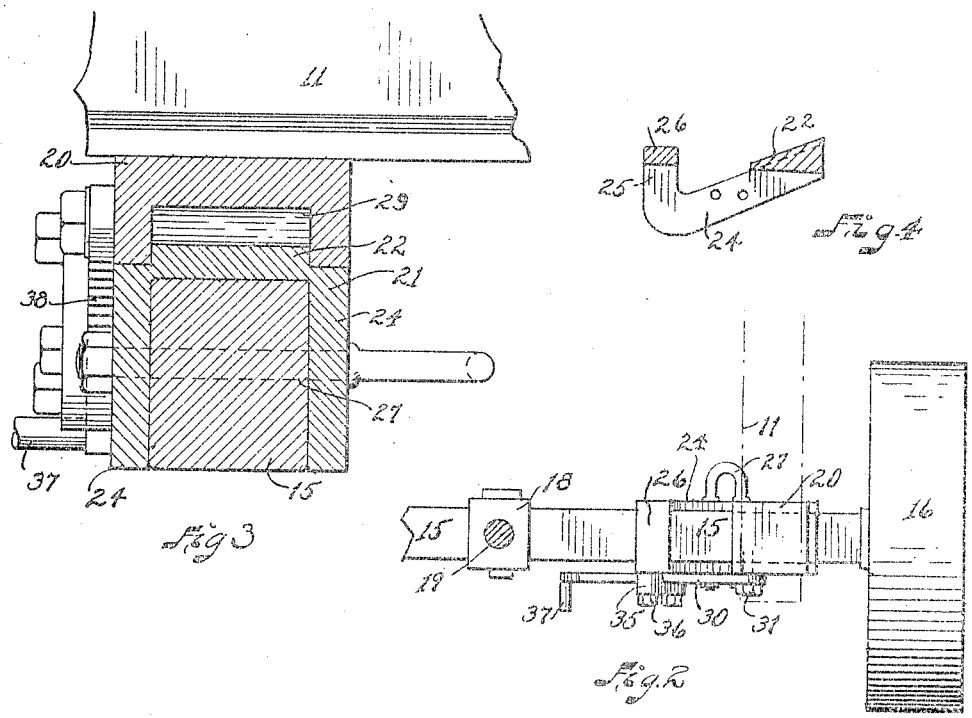

UNITED STATES PATENT OFFICE.

HOLLIS H. HARRIS, OF LORAIN, OHIO, ASSIGNOR TO THE THEW AUTOMATIC SHOVEL COMPANY, OF CLEVELAND, OHIO, A CORPORATION OF OHIO.

TRUCK.

1,081,041.  Specification of Letters Patent.  Patented Dec. 9, 1913.

Application filed April 16, 1913. Serial No. 761,548.

*To all whom it may concern:*

Be it known that I, HOLLIS H. HARRIS, a citizen of the United States, residing at Lorain, in the county of Lorain and State of Ohio, have invented a certain new and useful Improvement in Trucks, of which the following is a full, clear, and exact description, reference being had to the accompanying drawings.

This invention relates to trucks of the type wherein one pair of wheels are journaled on an axle swiveled to the truck body and adapted to be swung to steer the truck.

The object of the invention is to provide simple and effective means, operatable at will, for supporting the superstructure from points on the axle beside the central swivel, thus preventing tipping of the superstructure.

My invention is well adapted for use on the trucks of steam shovels, excavators, and similar machines having a steering axle.

In its preferred form, the invention comprises an inclined seat mounted on the axle, a wedge slidable on the seat and adapted to abut the under face of the member of the superstructure, and a suitable operating device for forcing the wedge along its seat into such engagement and there holding it.

The invention is hereinafter more fully explained and the essential characteristics are summarized in the claims.

In the drawings, Figure 1 is an end elevation of a portion of a truck equipped with my mechanism; Fig. 2 is a plan of a portion of the steering axle of such truck and one of the wheels showing my blocking mechanism mounted on the axle between the swivel and the wheel; Fig. 3 is an enlarged cross section on the line 3—3 of Fig. 1; Fig. 4 is a vertical central section of the attachment forming the seat for the wedge.

As shown in Fig. 1, the superstructure of the truck consists of a body 10 and a supporting frame comprising longitudinal I-beams 11 and transverse braces 12. Such frame has on its under side a seat 13 for the swivel of the steering axle. The steering axle is designated 15. The wheels 16 are journaled on its ends and at its center it is pivoted on a horizontal pivot 17 to a block 18, which is swiveled in the seat 13 by means of the upwardly extending swivel-journal 19. This much of the construction is a usual one in steam shovels, and similar machines for excavators adapted to travel independently of any trackway.

In machines of the character just described, the superstructure usually has two separated points of support on the non-steering axle, but the swiveling of the steering axle provides only one central support at that portion of the machine, so that when the boom is swung to one side or the other the machine tends to tip down at one corner or the other adjacent to the steering wheels. It is the object of my invention to provide very simple and effective mechanism to prevent such tipping, when the machine is at work excavating, the mechanism being readily moved to idle position to enable the axle to steer the machine when desired.

In each of the figures, 20 indicates a wedge having a horizontal upper face and an inclined lower face. 21 indicates an inclined seat secured to the steering axle and supporting a wedge so that it may be forced outwardly and upwardly into engagement with the under face of the I-beams 11 of the superstructure frame to block and support the superstructure. The seats 21 are U-shaped blocks designed to straddle the axle and be secured thereto. This block has an intermediate portion 22 of the same width as the axle and designed to rest on its upper surface. The intermediate portion inclines upwardly toward the wheel, as shown at 23. The under surface of this portion 22 is formed approximately horizontally to fit on the upper face of the axle. The seat has side straps 24 which extend downwardly from the lower part of the intermediate portion 22, these side straps fitting snugly against the sides of the axle, as shown in Fig. 3. The side straps, near their inner ends, extend upwardly, as shown at 25, Fig. 1, and at their upper ends are connected to a cross brace 26, Fig. 2, which rests on the top of the axle. The seat is thus supported directly by the top surface of the axle and snugly embraces the axle. It is held against displacement thereon by one or more bolts 27 passing into or through the axle. The two bolts shown for this purpose may conveniently be the shanks of the U-shaped bolt, which furnishes means for attaching the chain which pulls the axle to steer the machine.

It will be seen that the seat 21 described provides a pair of supporting guides on the front and rear faces of the axle and continues supporting the guides in the same plane above the axle, where the guides are on opposite sides of the intermediate portion 22 which has the same width as the axle. The wedge 20 is provided with a groove 29 on its under side, which is designed to straddle the intermediate portion 22 of the strap or to straddle the axle according to the position of the wedge. When the wedge is moved toward the swivel of the axle it slides downwardly on the guides of the seat into idle position, the wedge straddling the axle. When it is desired to block the superstructure, the wedge is forced outwardly, riding up on the inclined guides and coming into a position where a portion or all of the wedge straddles the intermediate part 22 of the strap.

To conveniently effect the movement of the wedge and hold it in desired position, I pivot to the side of the wedge a link 30. The pivoting is shown as effected by a suitable cap screw 31. The link extends inwardly between the face of the upper portion 25 of the seat and a stirrup 35, which is secured to the side of the seat by screws 36. The link is provided with a handle 37; on its under face it has a ratchet rack 38 which coöperates with an inclined abutment 39 formed on the inner face of the stirrup. By taking hold of the handle 37 the operator may pull the link and wedge outwardly, the wedge sliding upwardly on the seat until it abuts the under face of the I-beam 11. The ratchet rack and the abutment 39 hold the wedge in this position, the link resting by gravity in engagement with the stationary tooth. When desired to release the wedge, it is only necessary to knock the handle 37 upwardly, releasing the link and allowing the wedge to slide or be pushed downwardly.

It will be seen that there is a considerable range of position for the wedge with it still beneath the I-beam 11. This enables the wedge on one side to stand higher than that on the other in case it is desired to block the superstructure when the axle is not truly horizontal. Furthermore, this range of position enables the blocking to be effective if the axle is turned at somewhat of an angle to the normal transverse position.

My blocking device is easily attached to existing machines; it is cheap and simple, and there is nothing about it to get out of order.

Having thus described my invention, what I claim is:

1. In a truck, the combination, with a superstructure, of an axle connected therewith, a seat mounted on the axle and providing inclined guideways on the front and rear faces of the axle, and a wedge slidable on said guideways and adapted to coact with the under side of the superstructure, said wedge being recessed on its under side to straddle the axle.

2. The combination, with an axle and a superstructure, of a seat secured to the axle and having a pair of inclined guideways lying on opposite sides of the axle and extending above it and having a connecting portion resting on the upper face of the axle, and a wedge resting on the guideways and adapted to engage the superstructure.

3. In a truck, the combination, with the superstructure and axle, of means including a wedge designed to form a distance piece between the superstructure and axle, a bar for moving the wedge and provided with a ratchet rack on its lower edge, a handle projecting from its side, and a stationary tooth adapted to engage such rack and hold the wedge in adjusted position.

4. The combination, with the axle and superstructure, of a seat straddling the axle and providing inclined guideways on its front and rear sides, a wedge slidably mounted on such guideways, a link connected with the wedge provided with a handle and with a rack, a guide for the link, and a tooth designed to coöperate with the rack in various positions on the wedge.

5. In a truck, the combination of an axle, a superstructure swiveled thereon, a seat in the form of a U-shaped strap extending onto the front and rear sides of the axle, a wedge slidably mounted on such seat, a link connected with the wedge and provided with a handle, and a stirrup on the side of the strap forming a guide for the link.

6. In a truck, the combination, with a superstructure having a pair of parallel I-beams, a transverse steering axle intermediately swiveled to the superstructure, a pair of seats secured to the axle on opposite sides of its center, each seat providing inclined guideways extending outwardly and upwardly beneath the I-beams, wedges riding on such guideways and adapted to engage the under face of the I-beams, links secured to the said wedges and extending inwardly, and means adapted to engage the links to lock the wedges in adjusted position.

7. In a truck, the combination, with the superstructure having a pair of parallel I-beams, a transverse steering axle intermediately swiveled to the superstructure, a pair of seats secured to the axle on opposite sides of its center, each seat providing inclined guideways extending outwardly and upwardly beneath the I-beams, wedges riding on such guideways and adapted to engage the under face of the I-beams, said wedges being recessed on their under faces to enable them to straddle the axle, links pivoted to the wedges and extending inwardly and having ratchet teeth on their lower edges, guides for the links, and a stationary tooth for each link designed to coact with the link to hold the wedge in adjusted position.

8. In a truck, the combination, with a superstructure and axle, of inclined seats carried by the axle and inclining downwardly and inwardly, wedges riding on said seats, bars pivotally connected to the wedges and extending inwardly alongside of the axle for operating the wedges, and means for engaging the bars to hold them in locked position.

9. The combination, with a superstructure and a steering axle connected thereto, of an inclined seat mounted on the steering axle, a wedge having an inclined under face resting on the seat and adapted to abut an under face of the superstructure, said wedge being recessed on its under side to straddle the axle, and means for holding the wedge in desired position.

10. The combination, with an axle and superstructure, of a pair of inclined guideways secured to the opposite sides of the axle, a wedge recessed on its under side to straddle the axle and resting on said guideways, and means for locking the wedge in various positions on the guideways.

In testimony whereof, I hereunto affix my signature in the presence of two witnesses.

HOLLIS H. HARRIS.

Witnesses:
C. A. WEBER,
H. B. NEWTON.